(No Model.)

P. MURRAY, Jr.
GAS ENGINE.

No. 305,467. Patented Sept. 23, 1884.

Fig. 1.

Attest:
G. W. Graham
Jas. J. Kennedy

Inventor:
Peter Murray Jr.
Attys

Fig. 2.

(No Model.)  8 Sheets—Sheet 4.

P. MURRAY, Jr.
GAS ENGINE.

No. 305,467. Patented Sept. 23, 1884.

(No Model.) 8 Sheets—Sheet 5.

P. MURRAY, Jr.
GAS ENGINE.

No. 305,467. Patented Sept. 23, 1884.

Attest:
Geo. H. Graham
Jas. J. Kennedy

Inventor:
Peter Murray Jr
by Munday & Philipp
Attys (No Model.)　　　　　P. MURRAY, Jr.　　　　8 Sheets—Sheet 6.
GAS ENGINE.

No. 305,467.　　　　　　　Patented Sept. 23, 1884.

(No Model.) P. MURRAY, Jr. 8 Sheets—Sheet 7.
GAS ENGINE.

No. 305,467. Patented Sept. 23, 1884.

Attest:
Geo. H. Graham
Jas. J. Kennedy

Inventor:
Peter Murray Jr
by Munson & Philipp
Attys.

(No Model.)  
8 Sheets—Sheet 8.

P. MURRAY, Jr.
GAS ENGINE.

No. 305,467.  Patented Sept. 23, 1884.

Attest:  
Geo. H. Graham  
Jas. J. Kennedy

Inventor:  
Peter Murray Jr.  
by Munson & Philipp  
Attys.

UNITED STATES PATENT OFFICE.

PETER MURRAY, JR., OF NEWARK, NEW JERSEY, ASSIGNOR TO THE MURRAY MOTOR MANUFACTURING COMPANY, OF SAME PLACE.

GAS-ENGINE.

SPECIFICATION forming part of Letters Patent No. 305,467, dated September 23, 1884.

Application filed April 22, 1884. (No model.)

*To all whom it may concern:*

Be it known that I, PETER MURRAY, Jr., a citizen of the United States, residing in the city of Newark, county of Essex, and State of New Jersey, have invented certain new and useful Improvements in Gas-Engines, fully described and represented in the following specification and the accompanying drawings, forming a part of the same.

In an application for United States Letters Patent filed in the Patent Office on the 27th day of October, 1883, Serial No. 110,192, I have shown and described a gas-engine in which the power-piston is driven by the explosion of charges of a mixture of gas and air, which are admitted into and fired in the opposite ends of the power-cylinder alternately. In this engine the explosive mixture, instead of being drawn into the power-cylinder by the piston, flows to the cylinder from a tank or reservoir into which the mixture is forced by a pump, and in which a sufficient pressure is maintained to cause the mixture to pass into and fill the power-cylinder upon either side of the power-piston whenever the induction-valve of that end of the cylinder is opened. The induction and exhaust valves of the power-cylinder are operated through suitable connections from the main crank-shaft of the engine, and are so timed that the charge of the explosive mixture will be admitted into each end of the power-cylinder at the time when the power-piston has nearly or quite reached the limit of its stroke toward the opposite end of the cylinder, while the igniting-valves, which are also operated through suitable connections from the main crank-shaft, are so timed that the charge admitted, as just stated, will not be fired until the piston has reached the limit of its return-stroke, thereby permitting the charge in the power-cylinder to be compressed by the power-piston to a comparatively small volume before it is fired, all of which features are fully illustrated and described in my said application, to which reference is made for a more extended explanation of the same.

The present invention relates to a gas-engine of the same general construction as that shown in my said application, it being the object of the invention to improve and simplify the construction and organization of the engine in certain particulars, whereby its action will be rendered more uniform, reliable, and satisfactory.

To this end the invention consists, principally, in devices for effecting a more thorough mixture or commingling of the air and gas which form the explosive mixture before they are supplied to the power-cylinder; in a valve apparatus for controlling the admission of the explosive mixture to power-cylinder, and for firing the charges at the proper time; in a peculiar construction of the power-piston, whereby the flame caused by the explosion upon one side of the piston is prevented from being communicated past the piston to the explosive mixture on the opposite side; and in devices for regulating the quantity of the mixture introduced into the power-cylinder at each stroke of the engine, so as to make the power of the engine conform to the labor which it is required to perform at any particular time. The invention also embraces various details of construction and combinations of parts for obtaining the desired end, all of which will be hereinafter fully described and particularly pointed out.

To aid in a ready understanding of the details in the construction and organization to be hereinafter described, a brief description of the general construction of the engine will be first given. The air and gas which form the explosive mixture are admitted in suitable proportions into a chamber containing a mixing apparatus, through which these two fluids are drawn by a pump, and forced into a tank or reservoir in a thoroughly homogeneous condition, and ready to be supplied to the power-cylinder. The mixing-chamber and the tank are connected by a conduit-pipe which is provided with a valve apparatus controlled by a governor connected with some moving part of the engine, by which the pressure of the mixture in the tank is automatically regulated, so as to control the amount delivered to the cylinder of the engine at each stroke of the piston. By this means the speed of the engine is made to control the quantity of the mixture supplied to the cylinder, so that when the speed increases beyond what is desirable, it is brought back to its normal condition by a proportionate decrease of the mixture supplied to the cylinder. The tank just referred to communicates by a conduit-pipe with a valve-chest provided with a single induction-valve which controls the induction-ports at the opposite ends of the power-cylinder, and is operated from an eccentric upon the main crank-shaft, so as to open and close said ports alternately, and thus admit a charge to the opposite ends of the cylinder alternately. The main crank-shaft of the engine is provided with an eccentric which, through suitable connections, operates a pair of valves located at the opposite ends of the cylinder, and so arranged that at the proper time they open communication between the charges confined in the cylinder and igniting-burners which are carried by said valves. The exhaust-outlet is located at or near the middle of the length of the power-cylinder, and communicates directly with the open air, the power-piston being of such length with relation to the length of its stroke that the outlet will be fully opened just as the power-piston completes its stroke in each direction.

The details in construction of the organization thus outlined will now be described in connection with the accompanying drawings, in which—

Figure 1:
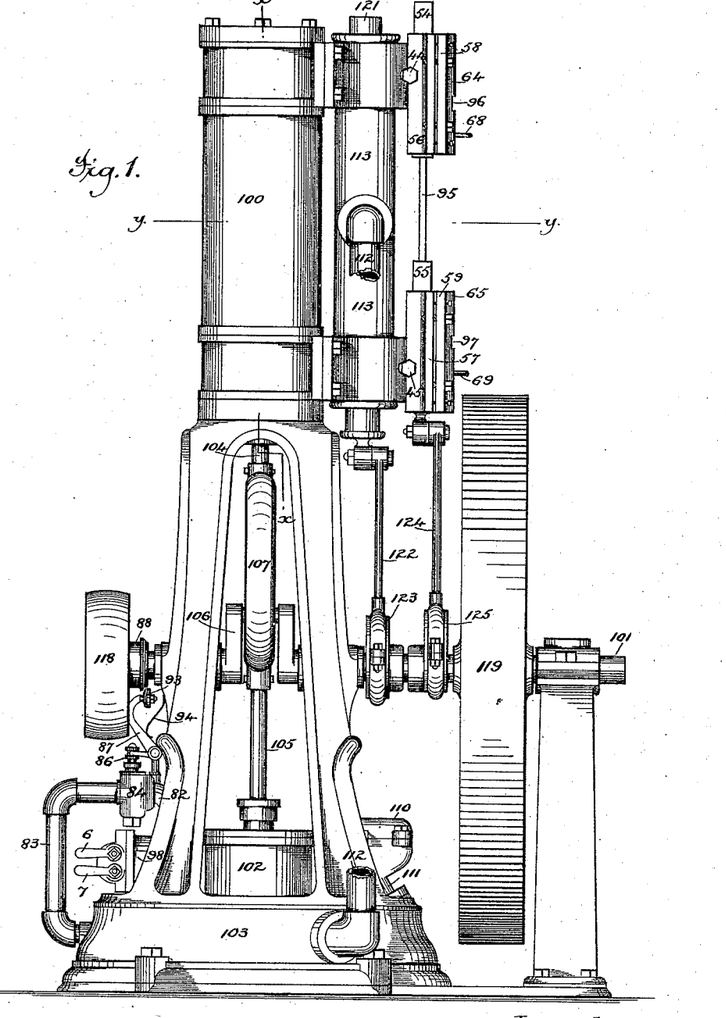
Figure 1 is a side elevation of a gas-engine similar to that shown in my former application, before referred to, but modified so as to embody the present invention.
Figure 2:
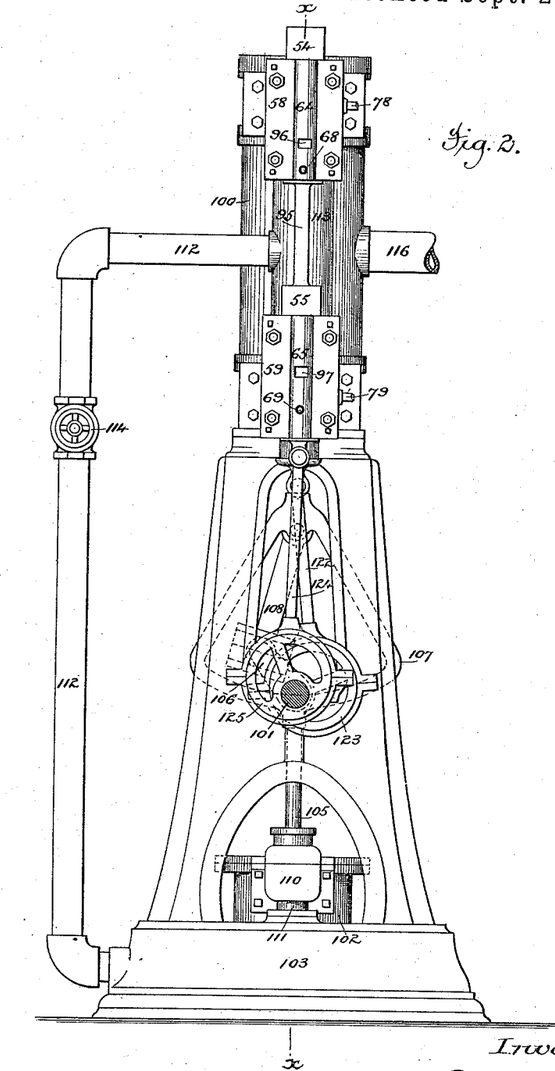
Fig. 2 is a like view looking from the right of Fig. 1, the fly-wheel and a portion of the supporting frame-work being omitted.
Figure 3:
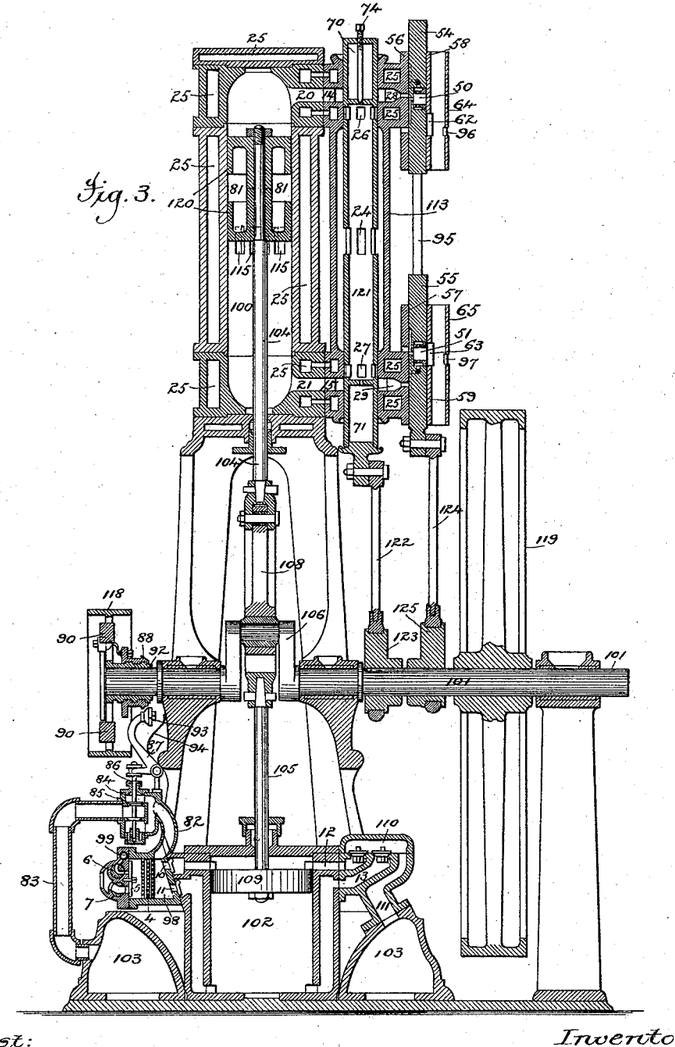
Fig. 3 is a vertical sectional elevation of the same, taken upon the line $x\ x$ of Fig. 2.
Figure 4:
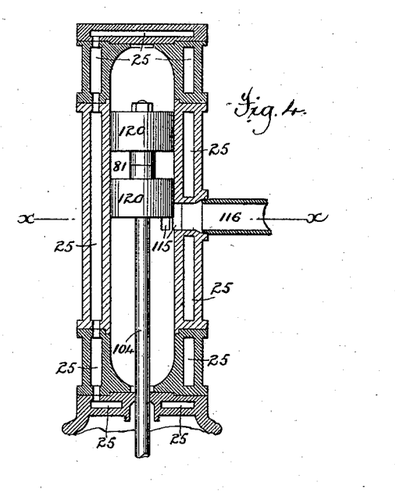
Fig. 4 is a vertical sectional elevation of the power-cylinder, taken upon the line $x\ x$ of Fig. 1.
Figure 5:
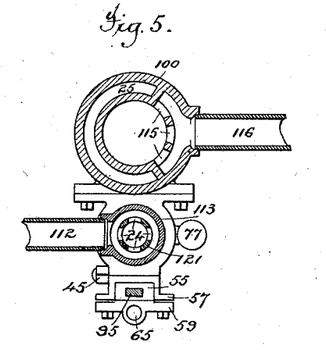
Fig. 5 is a horizontal section of the same, taken upon the line $x\ x$ of Fig. 4 and the line $y\ y$ of Fig. 1.
Figures 6, 7:
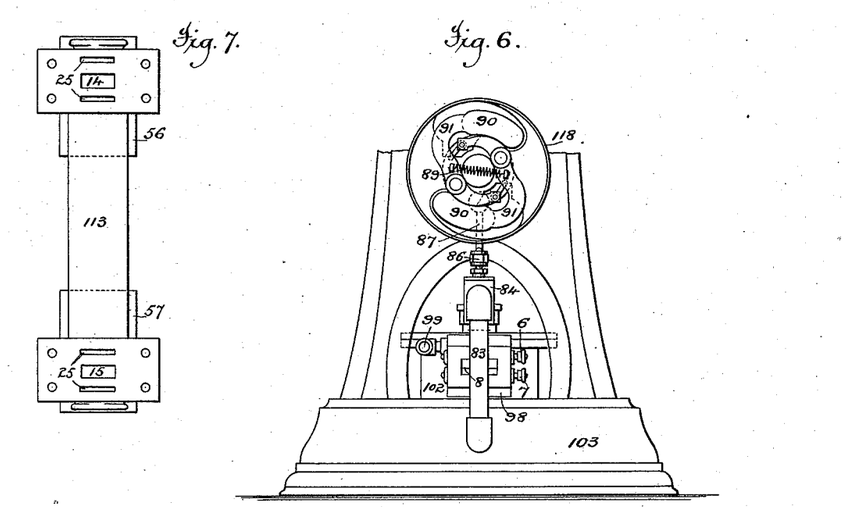
Fig. 6 is a side elevation of the lower part of the engine, looking from the left of Figs. 1 and 3.
Fig. 7 is an elevation of the valve-chest, looking from the cylinder side.

Referring particularly to Figs. 1, 2, and 3, it will be seen, as just stated, that the engine shown in the present case is, as to its general construction and organization, substantially the same as that shown in my prior application hereinbefore referred to. The power-cylinder 100 is supported in a vertical position upon a suitable frame-work, which, at a proper distance from the cylinder, also supports the main crank-shaft 101. In the organization here shown the induction-port at each end of the power-cylinder is opened to admit a charge of the explosive mixture to the cylinder at or just after the power-piston commences its stroke toward that end of the cylinder into which the charge is being admitted, so that the mixture, instead of being drawn into the cylinder by the power-piston, is simply allowed to flow in and fill the cylinder. This manner of charging the cylinder makes it necessary that the mixture should be maintained at a pressure somewhat above that of the atmosphere, and to effect this the engine is supplied with a pump, 102, by which a supply of the mixture is constantly forced into and maintained at the proper pressure in a tank, 103, located in the base of the engine or in some other convenient position.

For the sake of securing compactness in the structure, the pump 102 in the present case, as in my former application, is located directly beneath the power-cylinder, and the tank 103 is made of annular form, so as to surround the pump and form a base for the frame-work of the engine. The connections by which the rod 104 of the power-piston and the piston-rod 105 of the pump are operated from the main crank-shaft 101 are also substantially the same as shown in my former application, consisting of an open triangular frame, 107, which surrounds the shaft 101, and is connected at its apex to the crank 106 by means of a connecting-rod, 108, while its base is attached directly to the piston-rod 105 of the pump. The shaft 101 is also provided with the usual fly-wheel, 119, and belt-pulley 118.

Referring now particularly to Figs. 1, 3, 6, and 27, the apparatus by which the air and gas which form the explosive mixture are thoroughly mixed or commingled before they are admitted or forced into the tank 103, and by which the explosive mixture thus formed is maintained at the proper pressure in said tank, will now be described. The gas which is to enter into the explosive mixture is admitted from a source of supply through a pipe, 99, and a duct, 9, into the mixing-chamber 98, while the air which is to be mixed with said gas to form the explosive mixture is drawn into said chamber through a port, 8. In order to properly regulate the proportions of gas and air which are allowed to enter into the explosive mixture, the duct 9 and the port 8 are provided with cocks or valves 6 7, by which the size of said duct and port can be regulated, so as to admit a greater or less quantity of the fluids, as may be desired. The chamber 98 is provided with a valve, 5, which is arranged to close both the duct 9 and port 8, so as to prevent the escape of the fluids from the mixing-chamber under certain conditions, which will be hereinafter explained.

Figures 27, 28, 29:
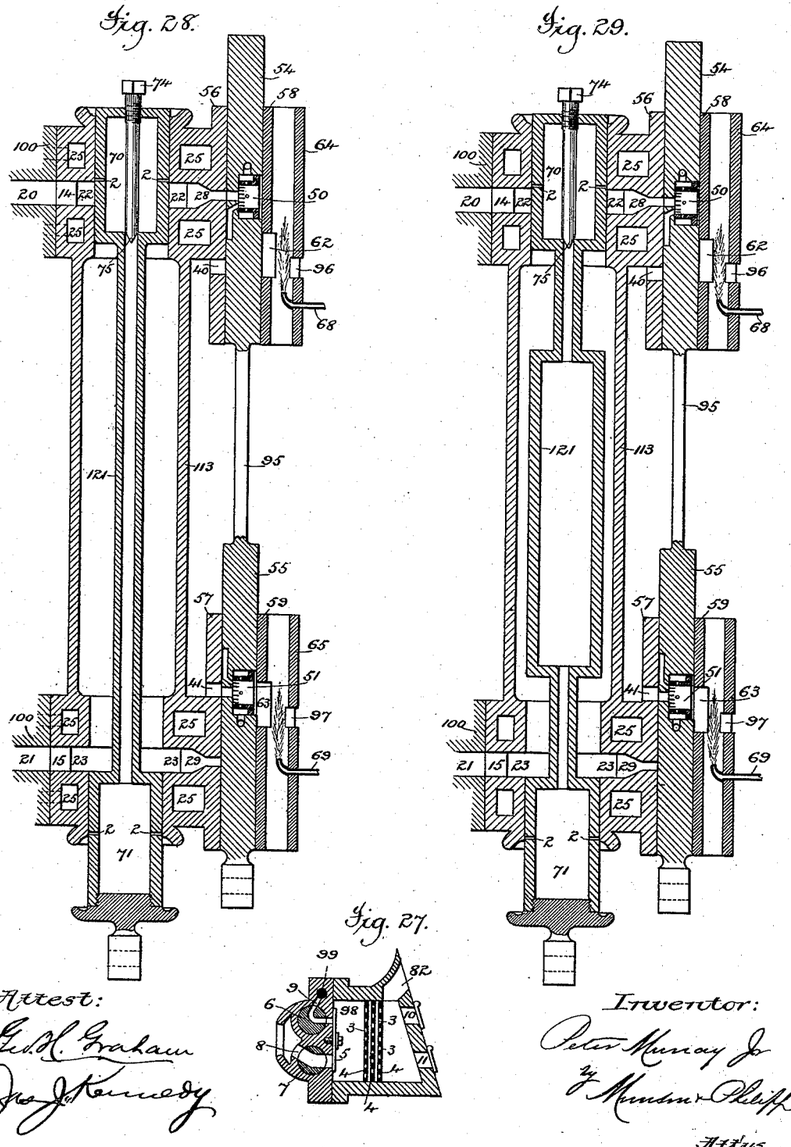
Fig. 27 is a vertical section, upon an enlarged scale, of the mixing-chamber, showing the mixing apparatus and the cocks and valves for controlling the admission of air and gas to the mixing-chamber.
Fig. 28 is a vertical sectional elevation upon the same scale as Figs. 8 and 9, showing an induction-valve of a modified construction.
Fig. 29 is a like view showing an induction-valve of still another form.

In order to secure a thorough mixing or commingling of the gas and air, which is necessary in order that the best results may be obtained when the mixture is exploded, the chamber 98 is provided with a number of diaphragms or partitions, 4, having small apertures 3, through which the air and gas must pass in small streams as they are drawn from the chamber into the pump. The several partitions are placed a short distance from each other, as shown in Fig. 27, and the apertures 3 in the several partitions are so arranged, as also shown in said figure, that they do not coincide with each other. From this arrangement it results that the small streams of gas and air, in passing through the apertures in the partitions from one side of the chamber to the other, are broken up, and large numbers of cross-currents are formed in the spaces between the partitions, so that by the time the fluids have passed through the apertures in all the partitions and are ready to be drawn into the pump, they have become so commingled as to form a practically homogeneous fluid or mixture. The mixing-chamber 98 is provided with two ports, 10 11, which communicate with the pump upon opposite sides of the piston 109. These ports are controlled by ordinary hinged valves, which operate, in the manner common in air-pumps, to admit and confine the fluid alternately in the opposite ends of the pump-cylinder. The pump is provided with two eduction-ports, 12 and 13, which are also controlled by ordinary valves, and through which the fluid drawn into the opposite ends of the pump is forced outward into an eduction-chamber, 110, from which it passes through a pipe, 111, to the tank 103.

The operation of this part of the apparatus is as follows: As the piston 109 ascends a charge of the explosive mixture will be drawn from the chamber 98 through the port 11 into the pump below said piston, and as the piston descends a like charge will be drawn through the port 10 into the pump above said piston, while the charge already below the piston will be ejected through the port 13 into the chamber 110, and thence through the pipe 111 to the tank. As the piston again ascends the charge drawn in above the piston will be ejected through the port 12, while a fresh charge will be drawn in below the piston; and so operation will be repeated, a charge of the explosive mixture being forced into the tank at each stroke of the engine. The pump 102 will be made of such size that at each stroke it will draw from the chamber 98 and force into the tank 103 a quantity of the explosive mixture just equal to that which under ordinary conditions it is desired the engine shall consume at each stroke. The tank 103 is provided with a conduit-pipe, 112, which communicates with a valve chest, 113, located by the side of the power-cylinder 100. The pipe 112 is provided with an ordinary throttle-valve, 144, by which the flow of the explosive mixture to the cylinder can be shut off, when desired, and it may also be provided with an ordinary relief-valve, as shown in my prior application, by which, in case the mixture in the tank should become ignited through any accident, or the pressure in said tank should become too great, relief may be afforded, so as to prevent damage to the apparatus.

The power-cylinder 100, instead of being provided, as in the structure shown in my prior application, with two sets of exhaust-ports, is provided in the present case with a single exhaust-outlet, and this outlet, instead of being controlled by an exhaust-valve, is arranged to communicate directly with the open air. This exhaust-outlet consists of one or more ports, 115, which are located at or near the middle of the length of the cylinder, and open directly into a pipe, 116, through which the products of combustion exhausted from the cylinder pass to the open air. In this connection it is also to be remarked that the power-piston 120 is of such length with relation to its stroke that the exhaust-ports 115 do not become uncovered, so as to permit the products of combustion to pass out of the cylinder until just before the piston completes its stroke.

Figures 8, 9, 10, 11:
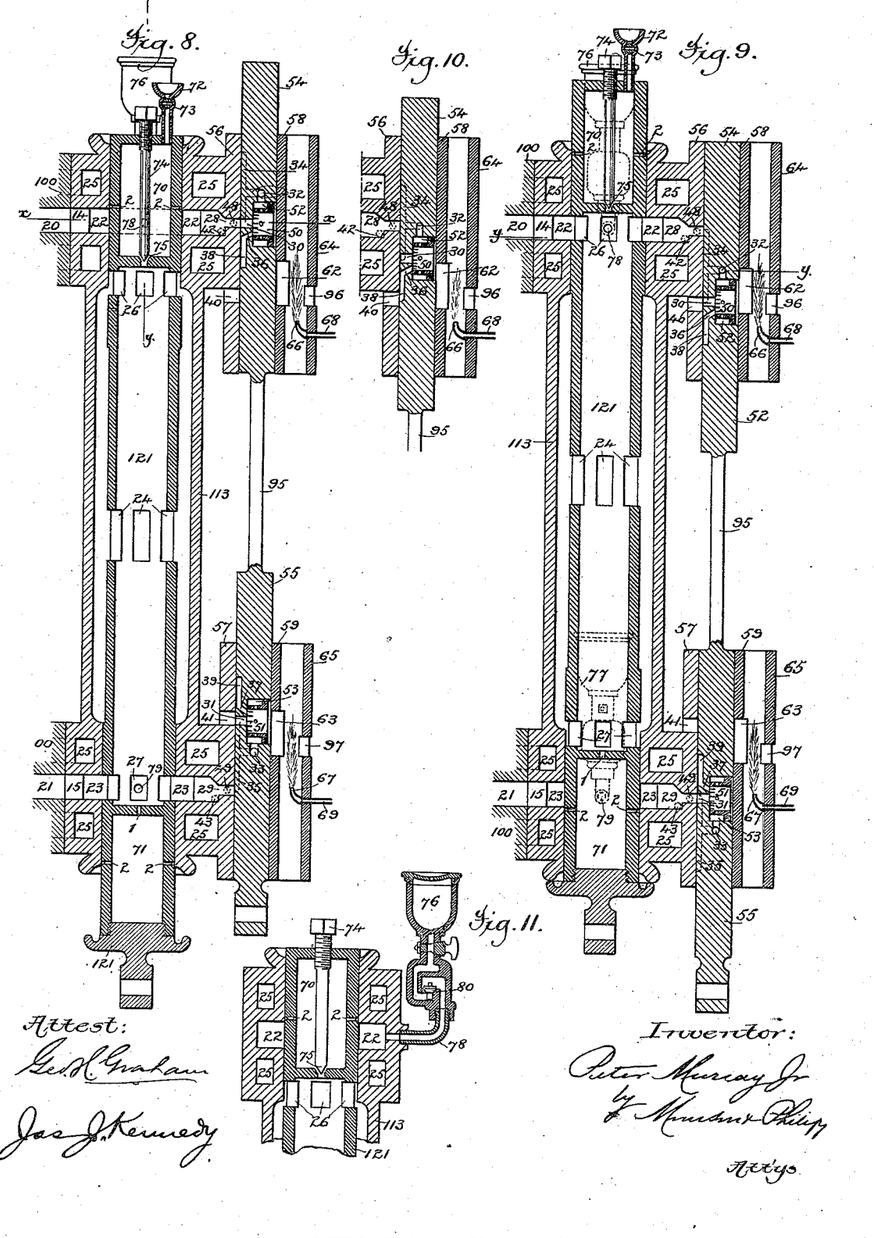
Fig. 8 is a vertical sectional elevation, upon an enlarged scale, of the valve-chest and the induction and igniting valves, showing said valves in position to admit a charge into the lower end of the cylinder, and fire the charge compressed in the upper end of the cylinder.
Fig. 9 is a like view showing the valves reversed in position.
Fig. 10 is a like view of the upper igniting-valve, showing the same in position intermediate of that shown in Figs. 8 and 9.
Fig. 11 is a like view taken upon the line $y\ y$ of Fig. 8, showing the oiling apparatus.
Figure 12:
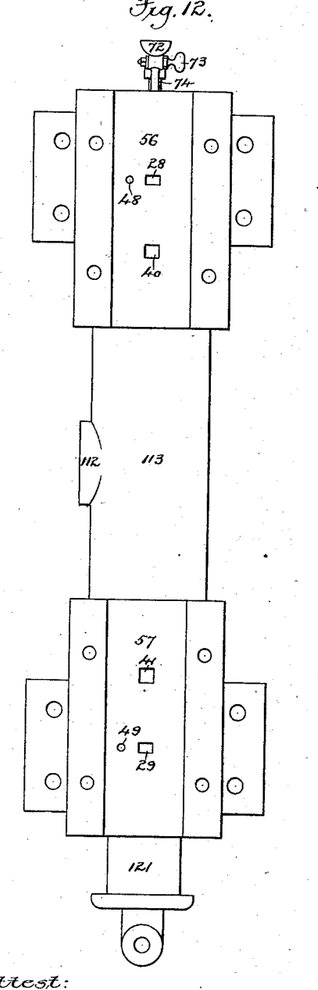
Fig. 12 is a side elevation upon a like scale of the valve-chest with the igniting-valves removed.
Figures 13, 14:
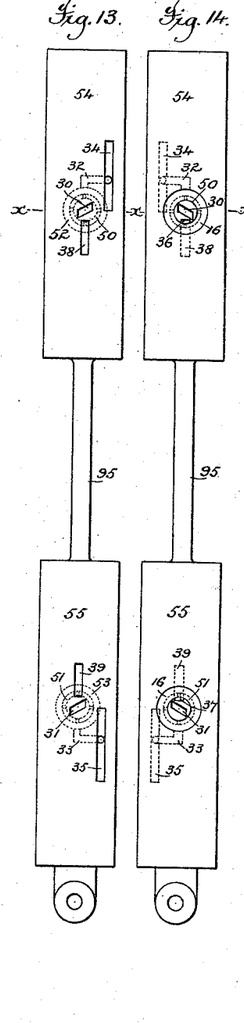
Fig. 13 is a like view of the igniting-valves, looking from the inner or cylinder side.
Fig. 14 is a like view of said valves, looking from the opposite side.
Figure 15:
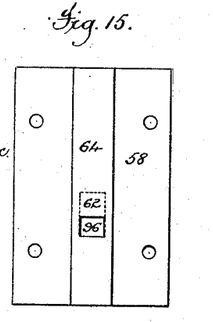
Fig. 15 is a like view of the covering-plate of the upper igniting-valve, looking from the outside.
Figure 16:
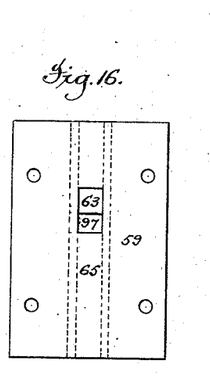
Fig. 16 is a like view of the covering-plate of the lower igniting valve, looking from the inside.

The exhaust-pipe 116 may, if desired, be extended so as to pass through the tank 103, thereby allowing the heat of the products of combustion to be utilized in raising the pressure of the explosive mixture in the tank, as shown in my said prior application. The walls of the power-cylinder 100 and the valve-chest 113 are provided with the usual water-spaces, 25, through which water is caused to circulate in the usual manner, to prevent undue heating of the parts. The power-cylinder is provided at its opposite ends with induction-ports 20 21, which register with ports 14 15, which communicate with annular chambers 22 23, formed in the inner walls of the opposite ends of the chest 113, and which are brought into communication with the interior of said chest at the proper times, to admit the charges of the explosive mixture to the opposite ends of the power-cylinder, by means of a single induction-valve, 121, which is operated through a rod, 122, from an eccentric, 123, upon the main crank-shaft 101. To effect the admission of the charges to the opposite ends of the power-cylinder at the proper times, the chest 113 and valve 121 are constructed as follows:

Referring particularly to Figs. 3, 8, and 9, it will be observed that the valve-chest 113 is cylindrical in form, and is contracted at its upper and lower ends, just below the chambers 22 23, so as to afford bearings for the valve 121, which is also cylindrical in form and hollow throughout the greater portion of its length. It is to be remarked that, although the valve 121 is made cylindrical in the present instance, it may be square, polygonal, or of any other desired form in cross-section. The valve, it will be observed, is provided at or near the middle of its length with a number of ports 24, through which the explosive mixture admitted to the chest 113 is permitted to pass, so as to enter the interior of the valve. This valve is also provided, at a suitable distance from each end, with a number of ports 26 27, which are so positioned that when the valve is in its lowermost position, as shown in Fig. 8, the ports 27 will coincide with the chamber 23, so as to permit the mixture to pass from the interior of the valve, through the ports 15 to 21, into the lower end of the power-cylinder, and that when the valve is in its uppermost position, as shown in Fig. 9, communication between the ports 27 and the chamber 23 will be cut off, while the ports 26, at the upper end of the valve, will coincide with the chamber 22, so as to permit the mixture to pass from the interior of the valve, through the ports 14 to 20, into the upper end of the power-cylinder. It will be seen that by this arrangement a perfectly-balanced valve is secured, so that no power is necessary to hold it in any position to which it is moved. It will also be observed that the ends 70 71 of the valve are extended a sufficient distance beyond the ports 26 27 to keep the ports 20 21 closed during the entire stroke of the valve, except when they are in communication with the chest 113. The purpose of this construction will be apparent when the operation of the engine is explained.

The eccentric 123, by which the valve 121 is operated, is so positioned upon the crank-shaft that communication will be established between the valve-chest 113 and each end of the cylinder, to admit of a charge of the explosive mixture just as the power-piston is completing its stroke toward the opposite end of the power-cylinder, and that communication will be shut off between said valve-chest and that end of the cylinder which is receiving the charge just after the power-piston has commenced its return-stroke, thereby confining the charge just admitted in the power-cylinder, so that it will be compressed therein by the return-stroke of the power-piston.

Figures 20, 21, 22, 23, 24, 25, 26:
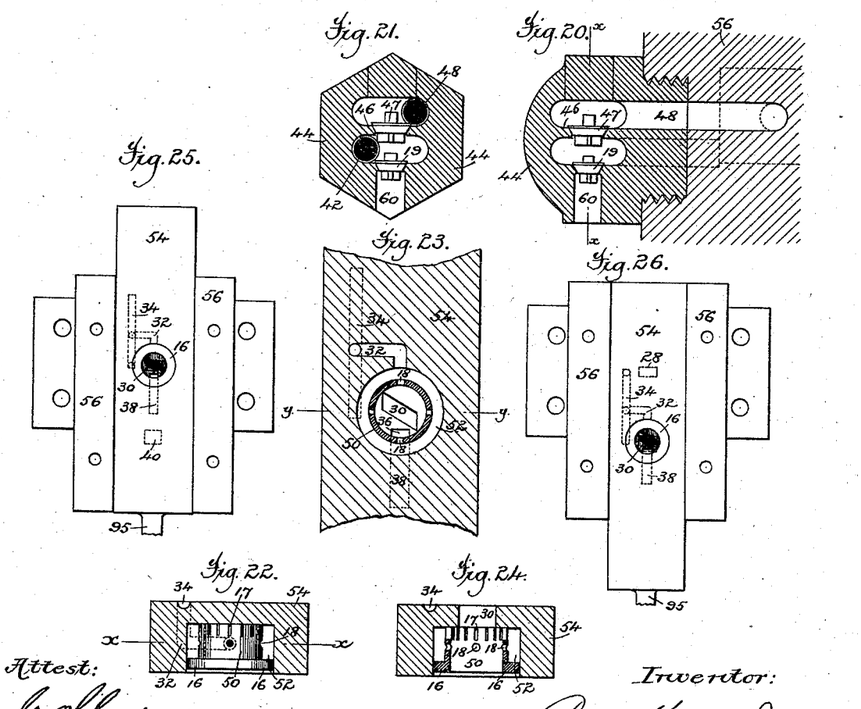
Fig. 20 is a like view taken upon the line $y\ y$ of the same figure.
Fig. 21 is a like view taken upon the line $x\ x$ of Fig. 20.
Fig. 22, a horizontal section upon a like scale taken upon the line $x\ x$ of Figs. 13 and 14 and the line $y\ y$ of Fig. 23.
Fig. 23 is a vertical section upon a like scale taken upon the line $x\ x$ of Fig. 22.
Fig. 24 is a horizontal section upon a like scale taken upon the line $y\ y$ of Fig. 23.
Fig. 25 is an outside face view, upon the same scale as Figs. 12, 13, and 14, of the upper igniting-valve, showing the covering-plate removed and the valve in position to fire the charge in the upper end of the power-cylinder.
Fig. 26 is a like view showing the valve in the position it will occupy when the charge is being admitted to the upper end of the power-cylinder.

The igniting-burners 50 51, by which the charges confined in the opposite ends of the power-cylinder are exploded, alternately, are carried in recesses 52 53 in a pair of valves, 54 55, which are connected to each other by a rod, 95, and slide between faces 56 57, formed upon opposite ends of the valve-chest 113 and covering-plates 58 59, said valves being operated through a rod, 124, from an eccentric, 125, upon the main crank-shaft 101, as shown in Figs. 3, 8, 9. The igniting-burners 50 51, which are of annular form and of a length about equal to the depth of the recesses 52 53, in which they are located, are provided at their outer ends with flanges 16, (see Figs. 22 and 24,) which fill the recesses 52 53, so as to form annular chambers in said recesses around the inner ends of the burners. The ends of the burners are provided with a series of slots, 17, and also with a number of small apertures, 18, by which communication is opened between the interior of the burners and the annular chambers formed in the recesses in which they are located, and through which the mixture passes in small jets to feed the flames which burn upon the inside of the annular burners. The valve-chest 113 is provided with two ports, 28 29, which open outward from the annular chambers 22 23 through the faces 56 57, and the valves 54 55 are provided with corresponding ports, 30 31, which open inward from the recesses 52 53, and are in such position that, as the valves reciprocate, they will come opposite the ports 28 29, and thus bring the charges confined in the cylinder into communication with the igniting-burners, so as to fire said charges at the proper times.

By reference to Figs. 12, 13, 14, 23, 25, and 26, it will be observed that the ports 28 29 are rectangular in form, while the ports 30 31 are of rhomboidal form, from which it results that as the valves move along the faces in which the ports 28 29 are located, the opening through which the mixture passes from the cylinder to the burner is so gradually enlarged as to prevent the mixture rushing out into the burner so rapidly as to extinguish the flame of the burner before it can be communicated inward to the charge in the cylinder. The purpose of this construction will more fully appear when the operation of the engine is explained.

Figure 17:
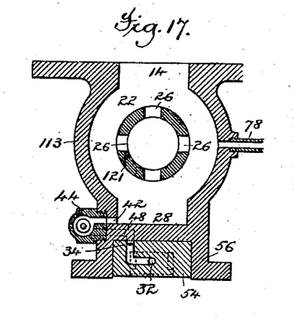
Fig. 17 is an irregular cross-section taken upon the line $y\ y$ of Fig. 9.

The valve 54 is provided with a duct, 32, which passes upward from the recess 52, (see Fig. 23,) then bends laterally and then inwardly, opening outward into a channel, 34, (see Fig. 17,) formed upon the inner face of the valve and extending for some distance above and below said duct. (See Fig. 13.) The valve 54 is also provided with a port, 36, (see Figs. 8, 9, and 23,) which opens inward from the recess 52, inside the igniting-burner 50, to a channel, 38, formed in the inner face of the valve, and extending downward for some distance below the port 30 in such position that when the valve is passing upward from its lowermost position, it will be opposite a port, 40, formed in the lower part of the face 56, and thus keep the burner 50 in communication with the open air until just before said burner arrives in position to fire the charge. The valve 55 is provided with a duct, 33, a port, 37, and channels 35 39, and the face 57 with a port, 41, similar to the duct 32, port 36, channels 34 38, and port 40, just described, in connection with the valve 54 and face 56, except that they are located in reverse position with relation to the burner 51.

Figures 18, 19:
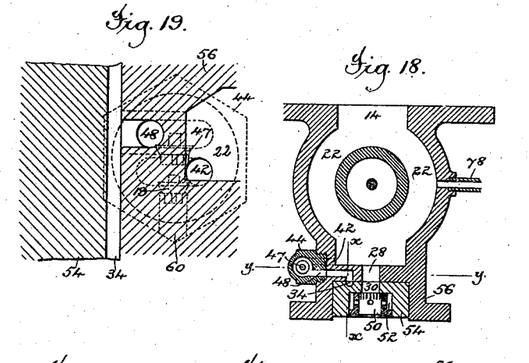
Fig. 18 is a like view taken upon the line $x\ x$ of Fig. 8.
Fig. 19 is a vertical section, upon an enlarged scale, taken upon the line $x\ x$ of Fig. 18.

The chamber 22, at the upper end of the valve-chest 113, is provided with a laterally-extending duct, 42, (see Figs. 17 and 19,) which communicates with the lower part of a chamber, 44, which is provided with a cross-partition, 46, (see Figs. 20 and 21,) having an opening which is controlled by an ordinary check-valve, 47, and from the upper part of which leads a duct, 48, (see Figs. 18 and 20,) which bends outward, so as to open into the channel 34, formed upon the inner face of the valve 54. That part of the chamber 44 which is below the partition 46 is provided with a port, 60, which opens outward to the open air, and is controlled by an ordinary check-valve, 19.

The chamber 23, at the lower end of the valve-chest 113, is provided with a duct, 43, which opens into a chamber, 45, which is provided with a partition, a port, and valves similar to the partition 46, port 60, and valves 19 and 47, and from which leads a duct, 49, similar to the duct 48, which opens outward into the channel 35 upon the inner face of the valve 55. The purpose of the various ports, ducts, channels, and valves just explained in connection with the valves 54 55, and the valve-chest 113, will more fully appear when the operation of the engine is described.

The plates 58 59, which cover the valves 54 55, are provided with apertures 62 63, which are arranged in such position as to communicate with the recesses 52 53, in which the igniting-burners are located, except at and a short time before and after the latter arrive in position to fire the charges in the cylinder. These plates are also provided with suitable chimneys, 64 65, in which are located permanent burners 66 67, which are supplied with gas through pipes 68 69, so as to be kept constantly burning, said burners being located in such position that their flames will lie nearly or quite opposite the recesses 62 63, so as to light the igniting-burners as they are carried by said recesses during the reciprocation of the valves. The chimneys 64 65 are also provided with apertures 96 97, (see Figs. 8 and 9,) located opposite the lower ends of the apertures 62 63, which serve a purpose which will be hereinafter explained.

The operation of the engine just described is as follows: The cocks 6 7 having been opened, so as to admit the gas and air into the mixing-chamber 98, the main crank-shaft will be turned by hand or otherwise until the pressure of the explosive mixture in the tank 103 is equal or about equal to that of the atmosphere. The throttle-valve 114 will then be opened, so as to allow the mixture in the tank to flow freely into the valve-chest 113. Let it now be supposed that the power-piston 120 has just commenced to move downward. As the piston 120 continues its downward movement the piston 109 of the pump will also move downward, so as to force another charge of the explosive mixture into the tank 103, and thereby raise the pressure of the mixture in the tank above that of the atmosphere. Just after the power-piston 120 reaches the limit of its downward stroke the eccentric 123, will, through the rod 122, move the valve 121 upward to the position shown in Fig. 9, so as to bring the ports 26 into register with the chamber 22. The explosive mixture, under the pressure which now exists in the tank 103, will rush through the ports 24 and 26 into the chamber 22, and thence through the ports 14 20, and fill the power-cylinder above the power-piston. After the crank-shaft 106 has passed its center, and the piston 120, in its ascent, has partly covered the exhaust-ports 115, the eccentric 123 will move the valve 121 downwardly, so as to cut off communication between the chest 113 and the port 20, and thus confine the charge admitted in the upper end of the cylinder. As the power-piston continues its ascent a small portion of the mixture confined in the cylinder and the annular chamber 22 will pass through the duct 42 into the chamber 44, beneath the valve 47, and, raising said valve, will flow through the duct 48 into the channel 34, and thence through the duct 32 to the annular chamber in the recess 52, around the burner 50, from which chamber the mixture will issue through the slots 17 and apertures 18 in small jets into the interior of the burner. The port 30 of the valve 54 being at this time in register with the port 40 of the face 56, the heat generated by the flame of the burner 66 will draw a current of air through said ports, so as to carry the mixture outward through the aperture 62, and thus light the burner 50 from the flame of the permanent burner 66. It will readily be seen that, before the explosive mixture issuing through the slots 17 and apertures 18 will be brought into communication with the flame of the burner 66 a considerable quantity of said mixture will have accumulated in the recess 52 and aperture 62, so that as light explosion will be caused each time that the igniting-burner is lighted, and these explosions, unless means are provided for preventing it, are liable to extinguish the permanent burners. To obviate this danger, the chimneys 64 65 are provided with the apertures 96 97, which serve to relieve the chimneys of the force of the explosions, and thus prevent the permanent burners from becoming extinguished. As the power-piston 120 continues its upward movement, compressing the charge in the upper end of the power-cylinder, the eccentric 125 will, through the rod 124, commence to move the valves 54 55 upward. As the valve 54 continues to move upward the igniting-burner 50 will continue to be fed by the mixture confined in the upper end of the power-cylinder, the channel 34 being of such length as to maintain communication between the ducts 48 and 32. As soon as the valve 54 has moved upward so far as to cut off communication between the ports 30 40, the port 36 and channel 38 will come into communication with the port 40, as shown in Fig. 10, so that air will continue to be supplied to the igniting-burner until just before said burner arrives in position to fire the charge. Just after the power-piston arrives at the limit of its upward stroke the valve 54 will also arrive at the limit of its upward movement, so as to shut off communication between the channel 38 and the port 40 and also between the apertures 62 and the recess 52, in which the igniting-burner 50 is located, and at the same time bring the port 30 into communication with the port 28, as shown in Fig. 8, so that the flame of the igniting-burner 50 will be communicated, through the ports 30 28, the chamber 22, and the ports 14 20, to the charge confined in the power-cylinder above the power-piston, so as to explode said charge and start the piston upon its downward stroke. At the same time that the charge is fired in the upper end of the cylinder by the igniting-burner 50, as just explained, the valve 121 will arrive in position to bring the ports 27 into communication with the chamber 23 at the lower end of the power-cylinder, and the pump-piston 109 will have completed another stroke, so that the pressure in the tank will have been again raised above that of the atmosphere. This will cause the charge of the explosive mixture to rush through the ports 24 27 into the chamber 23, and thence through the ports 15 21 into the lower end of the power-cylinder. As soon as the power-piston has moved sufficiently far upon its downward stroke to partly cover the exhaust-ports 115, the valve 121 will have again commenced to move upward, so as to cut off communication between the chest 113 and the port 21, and confine the charge in the lower end of the power-cylinder, and at the same time a portion of the mixture confined in the cylinder will pass through the duct 43 into the chamber 45; thence past the valve in said chamber corresponding to the valve 47, already described, and thence through the duct 49 to the channel 35, from which it will pass through the duct 33 to the annular chamber formed in the recess 53, around the burner 51, so as to cause said burner to be lighted from the permanent burner 67 in the same manner as already described in connection with the burner 50. As the power-piston continues its downward movement the valve 55 will also move downward, so that just after said piston has completed its downward stroke the burner 51 will be brought into the position shown in Fig. 9, and the charge in the lower end of the power-cylinder will be exploded in the same manner as already explained in connection with the charge previously admitted to the upper end of the said cylinder. As the first charge is exploded in the lower end of the cylinder, as just stated, the valve 121 will again arrive in the position shown in Fig. 9, so as to admit a second charge to the upper end of the cylinder, and this charge, rushing into the upper end of the cylinder under the pressure existing in the tank, will expel all the products of combustion remaining in the cylinder through the exhaust-ports 115 to the open air. As soon as the charge has been thus admitted the power-piston 120 will again close the exhaust-ports, so as to confine the charge in the upper end of the cylinder, after which it will be fired, in the manner already explained, and so the operation will continue to be repeated, charges being thus admitted and fired alternately in the opposite ends of the cylinder.

The power-cylinder may, if desired, be provided with a relief-valve similar to that shown in my prior application, through which waste products of combustion can be driven out of the cylinder when necessary.

To stop the engine, it is only necessary to close the throttle 114. When this is done, no more of the explosive mixture can pass from the tank 103 to the valve-chest 113; but the momentum of the engine will cause it to make several revolutions after the throttle has been closed, and this will cause the pump to still force the mixture into the tank 103, so as to raise the pressure in said tank considerably above that of the atmosphere. This is a feature of considerable practical importance, as it always insures a sufficient pressure in the tank to charge the power-cylinder whenever the throttle-valve is again opened. It is of course apparent that the same result might be accomplished by providing a supplemental pump for charging the tank when it is desired to start the engine. With the reservoir 103 charged with the mixture, the only operations required to set the engine in motion are the opening of the throttle-valve and the turning of the main crank-shaft until the ports 26 or 27 at one end of the induction-valve have been opened to admit the charge upon one side of the power-piston, and the igniting-valves moved into position to fire said charge.

The rods 122 124 of the induction and igniting valves may, if desired, be provided with a mechanism similar to that shown in my application for Letters Patent filed January 12, 1884, Serial No. 117,558, by which the first charge can be admitted to and fired in the power-cylinder without the turning of the crank-shaft, if desired.

It will be observed that when the igniting-burners 50 51 are brought into position to fire the charges in the opposite ends of the cylinder, the pressure of the explosive mixture upon both sides of said burners is the same—that is to say, the mixture passes through the ducts 42 43 and connections to feed the burners at the same pressure that it passes through the ports 28 30 and 29 31 to the front of the burners to be exploded, so that the mixture upon both sides of the flame of the burner is in equilibrium, and thus the tendency to create a pressure which would be likely to extinguish the burner before the firing can take place is avoided. Attention has already been called to the fact that the ports 28 29 and 30 31, through which communication is established between the chambers 22 23 and the igniting-burners, are not of the same shape, the former being polygonal, while the latter are rhomboidal, in form. By reason of this construction the passage formed between the chambers 22 23 and the burners, by the bringing of these parts into coincidence, are so gradually opened that, even if a slight difference in pressure does exist between the mixture in the chambers 22 23 and that in the recesses 52 53, it will be so gradually communicated to the burners as to prevent all liability of extinguishing their flames. It is of course to be understood that the same result may be accomplished by making the coinciding ports of different forms from those shown. For example, one may be made round while the other is square, or both may be made round; or, when they are of the form shown, their order may be reversed, the rhomboidal ports being in the faces 56 57, while the rectangular ports are in the valves.

In operating engines of this construction it sometimes happens that a charge fails to become exploded at the proper time, so that the power-piston will proceed upon its stroke without having the charge exploded behind it. When this occurs, it has been found that just before the power-piston arrives in position to uncover the exhaust-ports 115, owing to leakage, and particularly to the fact that a portion of the charge has either been consumed by the igniting-burner, or has escaped unconsumed through the ducts and channels leading to said burner, a partial vacuum will be formed in the cylinder, so that as soon as the igniting-valve arrives in position to bring the igniting-burner into communication with the permanent burner, there will be a tendency to suck the flame through the ports and channels communicating with the cylinder, and thus effect a tardy firing of the charge. This is very undesirable in the practical operation of the engine, and consequently it is highly important to provide means by which such a tardy firing of the charge will be prevented. This is accomplished in the present case by the valves 19 and 47, located in the chambers 44 45. It has already been explained that so long as the explosive mixture is being forced from the cylinder through the ducts 42 43 the valves 47 will be raised, so as to permit the mixture to pass through the chambers 44 45 into the ducts 48 49, and thence to the igniting-burners. As soon, however, as a partial vacuum becomes formed in the power-cylinder so that, instead of there being a tendency to force the mixture through the ducts 42 43 outward, there is a tendency to draw the mixture in the opposite direction, the valves 47 become closed, so as to shut off communication between the ducts 42 43 and the ducts 48 49, while at the same time the valves 19 are raised, so as to permit air to pass from the ports 60 into the ducts 42 43 and fill the partial vacuum formed in the power-cylinder. The same result may be attained by increasing the throw of the eccentric 125, so that after the firing takes place or should take place the ports 30 31 will be carried on past the ports 28 29, and that the burners 50 51 will not be brought back into communication with the apertures 62 63 until after the power-piston has proceeded so far upon its stroke as to open the exhaust-ports 115, thus making the valves 54 55 cut off communication between the burners and the interior of the cylinder; or the same result can be obtained by the use of an independently-operated cut-off valve arranged to close communication between the burner and cylinder until after the power-piston has proceeded far enough upon its stroke to open the exhaust-ports. Any of these arrangements are to be considered as equivalents.

In order to properly lubricate the valve 121 where it passes through the contracted portions of the valve-chest 113, the ends 70 71 of the valve are provided with oil-chambers having small lateral ports, 2, opening outward against the bearing-surfaces of the valve-chest. The upper end of the valve is provided with a funnel-shaped cup, 72, having a cock, 73, by means of which the chamber in the end 71 can be filled and then closed, so as to prevent the oil from being forced out of the chamber through the cup 72 by the pressure of the mixture in the valve-chest. The upper end of the valve is also provided with a threaded rod, 74, which passes through the chamber, and is made conical at its lower end, so as to control an opening, 75, formed in the bottom of the chamber. The top of the lower chamber is provided with a small opening, 1, through which said chamber is filled with oil from the upper chamber by the raising of the rod 74.

In order to properly lubricate the piston 120 and the rod 104 where it passes through the stuffing-box in the end of the cylinder, the upper and lower ends of the valve-chest 113 are provided with oil-cups 76 77, the stems 78 79 of which open into the chambers 22 23. These oil-cups are provided with the usual cocks for controlling the flow of oil through the stems, and also with check-valves 80, which are arranged, as shown in Fig. 11, so as to raise and allow the oil to flow from the cups into the chambers 22 23, and to close and prevent the oil from being forced from the cups by the compression and the explosion of the charges. From this construction it results that, while the charges are being admitted, the force of the explosive mixture in passing through the chambers 22 23 will cause a partial vacuum to be formed in the stems 78 79, so that the checks 80 will be raised and a small amount of oil drawn into chambers 22 23, from which it will be carried by the force of the incoming charges into the power-cylinder, upon the walls of which it will adhere, so as to lubricate the piston, and also gradually work downward and accumulate around the rod in the lower end of the cylinder, so as to keep it also properly lubricated. Some of the oil which drops from the opening 75 into the interior of the valve 121 will also be carried through the ports 26 14 20 and 27 15 21 into the power-cylinder by the force of the incoming charges, so as to aid in lubricating the piston and rod.

In operating engines of this class it sometimes happens that the flame caused by the explosion of the charge upon one side of the power-piston is forced past the piston, so as to cause a premature explosion of the charge, which is at the same time being compressed upon the opposite side of the piston. To obviate this the piston 120 is, in the present case, made in two parts, so that an annular chamber, 81, is formed at its center, which at each reciprocation of the piston will be brought into communication with the open air through the exhaust-ports 115. From this construction it results that before the flame can be forced past the piston, so as to fire the charge which is confined upon the opposite side, the air contained in the chamber 81 must be raised to a pressure greater than that of the explosive mixture in front of the piston; but before this can be done the piston will have proceeded far enough upon its stroke to bring the chamber 81 into communication with the exhaust-ports 115, and thus again reduce the pressure in the chamber 81 to that of the atmosphere.

As the labor which the engine is called upon to perform varies at different times, it is desirable to provide means by which the power of the engine can be automatically regulated, so as to conform to these temporary variations. This may be done either by increasing and decreasing the amount of the explosive mixture supplied to the engine at each stroke of the piston, or by increasing and decreasing the quantity of gas which is allowed to enter the explosive mixture, and thus increasing and decreasing its richness or strength. The former method has been adopted in the present case. For this purpose the pump 102 is provided with a valve apparatus connected with a governor, which operates, when the speed of the engine increases beyond what is desirable, to open communication between the tank 103 and the suction side of the pump, so that a part of the mixture supplied to the pump will be taken from the tank, thereby reducing the pressure in the tank, and consequently the quantity of the mixture delivered to the cylinder of the engine at each stroke. To effect this, the mixing-chamber 98 and the tank 103 are provided with pipes 82 83, which communicate with a chamber, 84, upon opposite sides of a differential valve, 85, the rod 86 of which is connected to one arm of a bell-crank lever, 87, the opposite arm of which is acted upon by the threaded sleeve 88 of a centrifugal governor, which is of substantially the same construction as that described in my former application, hereinbefore referred to.

When the engine is running at its normal speed, the spring 89 holds the weights 90 of the governor inward away from the rim of the pulley 118, so as to keep the sleeve 88 out of contact with the lever 87, and thus permit the valve 85 to remain closed, so as to shut off communication between the chamber 98 and the tank 103. When, however, the speed of the engine is accelerated, the centrifugal force of the weights 90 will overcome the tension of the spring 89, and allow the weights to take positions nearer the rim of the pulley, and in so doing they will rock the levers 91, so as to give the sleeve 88 a partial turn upon its hub 92, and cause the sleeve to move inward a short distance. This will bring the end of the sleeve into contact with the bowl 93 of the lever 87, thereby rocking the lever and opening the valve 85. As soon as the valve 85 is opened, the whole or a part of the explosive mixture, depending upon the extent to which the valve is opened, which is drawn into the pump, will pass from the tank, instead of through the duct 9 and port 8, and the amount thus withdrawn from the tank will tend to reduce the pressure in the tank, so that the amount of the mixture which will be supplied from the tank to the power-cylinder will be proportionately diminished, and this in turn will cause a reduction in the speed of the engine. As soon as the engine has fallen back to its normal speed the spring 89 will again draw the weights inward, thereby withdrawing the sleeve 88 from the bowl 93 of the lever 87, and permitting the spring 94 to close the valve 85. If at any time the speed of the engine becomes suddenly increased, so as to open the valve 85 and allow the full pressure of one tank to pass to the chamber 98, the valve 5 will at once become closed, so as to prevent the escape of any of the explosive mixture through the port 8 to the open air.

This valve will, also, during the time it remains closed, prevent the pump from drawing in any additional gas and air through the port 8 and duct 9.

Although I have in the present case shown the invention as embodied in a vertical engine, yet it will be readily seen that by a slight modification in the construction of certain of the parts, the invention may be embodied in an engine of horizontal form, if such form should be preferred. It will also be seen that a single-acting engine, either of a vertical or horizontal form, can readily be constructed so as to embody many of the features of the present invention. To do this it would only be necessary to omit one of the induction-ports of the power-cylinder and one of the igniting-valves, and its communicating ports, &c., and leave the corresponding end of the power-cylinder open. In such case a single instead of a double acting pump would be employed to force the explosive mixture into the tank.

It may also be remarked in passing that, if preferred, a single-acting pump may be used in connection with a double-acting power-piston; but in such case the pump would have to be speeded up so as to make two strokes to one of the power-piston, and this would not be found desirable.

In conclusion, it is to be remarked that modifications may be made in many of the details of the construction hereinbefore described, and particularly in the construction of the induction-valve, without departing from the spirit of the invention. Two of the several modifications which may be made in said valve are illustrated in Figs. 28 and 29. In the construction shown in the first of these figures, the ports 24, 26, and 27 have been omitted from the valve, the valve being contracted at its middle, so as to allow the explosive mixture to pass directly from the valve-chest 113 to the chambers 22 23, when the valve is in position to admit the charges into the opposite ends of the cylinder, instead of passing brought the interior of the valve, as in the construction just described. The construction shown in Fig. 29 is substantially the same, except that the central portion of the valve is enlarged, so as to nearly fill the valve-chest, and thus permit a much less quantity of the explosive mixture to remain in said chest after communication is shut off between the chest and the power-cylinder.

The patentable features herein shown, but not claimed, are claimed in my prior applications filed October 27, 1883, January 12, 1884, and April 2, 1884.

What I claim is—

1. In a gas-engine, the combination, with the mixing-chamber 98, provided with the partitions 4, placed a short distance from each other and having apertures 3, which are arranged so as not to coincide with each other, and with openings for admitting air and gas upon one side of said partitions, of a pump communicating with the chamber upon the other side of said partitions, for withdrawing the mixture therefrom, substantially as described.

2. In a gas-engine, the combination, with the mixing-chamber 98, provided with the partitions 4, placed a short distance from each other and having apertures 3, which are arranged so as not to coincide with each other, and with openings for admitting air and gas upon one side of said partitions, of cocks or valves 6 7, for controlling said openings, and a pump communicating with the chamber upon the other side of said partitions, for withdrawing the mixture therefrom, substantially as described.

3. In a gas-engine, the combination, with the mixing-chamber 98, provided with partitions 4, placed a short distance from each other and having apertures 3, which do not coincide with each other, of openings for admitting the air and gas into said chamber upon one side of said partitions, a pump connected to said chamber upon the other side of said partitions and arranged to draw the mixture therefrom, and a tank arranged to receive the mixture from said pump, substantially as described.

4. In a gas-engine, the combination, with the mixing-chamber, the pump, and the tank, of a passage connecting said tank and chamber, a valve controlling said passage, and a governor operated by the engine for moving said valve, substantially as described.

5. In a gas-engine, the combination, with the mixing-chamber for receiving the gas and air, the pump for withdrawing said gas and air from the chamber, and the tank for receiving the mixture from the pump, of a passage connecting said tank and chamber, a valve controlling said passage, a governor operated by the engine for moving said valve, and the valve 5, for preventing the escape of the mixture from the mixing-chamber through the admission-openings, substantially as described.

6. In a double-acting gas-engine in which the charges are admitted into the power-cylinder in front of the advancing piston so as to be compressed thereby, the combination, with the power-cylinder provided with the induction-ports 20 21 at its opposite ends, and with the valve-chest 113, communicating with both of said ports, of the single reciprocating valve 121, arranged to control both of said ports, and provided with elongated ends 70 71, whereby the ports 20 21 are kept closed, except when in communication with the valve-chest 113, substantially as described.

7. In a double-acting gas-engine in which the charges are admitted into the power-cylinder in front of the advancing piston so as to be compressed thereby, the combination, with the power-cylinder provided with the induction-ports 20 21 at its opposite ends, and with the valve-chest 113, communicating with both of said ports, of the hollow reciprocating valve 121, provided with the ports 24 26 27, and with the elongated ends 70 71, whereby the ports 20 21 are kept closed, except when in communication with the valve-chest 113, substantially as described.

8. In a double-acting gas-engine in which the charges are admitted into the power-cylinder in front of the advancing piston so as to be compressed thereby, the combination, with the power-cylinder provided with the induction-ports 20 21 at its opposite ends, and with the valve-chest 113, communicating with both of said ports, of a single valve arranged to open and close said ports alternately, to admit and confine the charges, the firing-ports 28 29, communicating with the induction-ports, and the valves 54 55, carrying igniting-burners to fire the charges after they have been compressed in the power-cylinder, substantially as described.

9. In a gas-engine, the combination, with the power-cylinder, having a port through which the charge is fired, of a moving valve carrying an igniting-burner, suitable passages through which said burner is fed from the charge in the power-cylinder, and a valve by which communication inward to the power-cylinder through said passage is cut off from the time when the charge is exploded or should be exploded until after the power-piston has opened the exhaust-ports, substantially as described.

10. In a double-acting gas-engine, the combination, with the power-cylinder having ports through which the charges are fired in the opposite ends of the cylinder, of moving valves carrying igniting-burners, suitable passages through which said burners are fed from the charges in the power-cylinder, and valves by which communication inward through said passages to the power-cylinder is cut off from the time when the charges are exploded or should be exploded until after the power-piston has opened the exhaust-ports, substantially as described.

11. In a gas-engine, the combination, with the power-cylinder having a port through which the charge is fired, of a valve carrying an igniting-burner, suitable passages through which said burner is fed from the charge in the cylinder, and an outwardly-opening valve, 47, controlling said passages, substantially as described.

12. In a gas-engine, the combination, with the power-cylinder having a port through which the charge is fired, of a valve carrying an igniting-burner, suitable passages through which said burner is fed from the charge in the cylinder, an outwardly-opening valve, 47, controlling said passages, a port, 60, opening outward to the air from said passages, and an inwardly-opening valve, 19, controlling said port, substantially as described.

13. In a gas-engine, the combination, with an igniting-valve, 54 or 55, having a recess, 52 or 53, in which is located an igniting-burner, of the annular burner 50 or 51, located in said recess, but not entirely filling the same, and provided with the openings 17 18, a duct through which the burning-fluid is supplied to the recess, so as to circulate around the outside of the burner and then pass through said openings, so as to support the flame upon the inside, and a port, 30 or 31, opening from the inside of the burner to the charge to be fired, substantially as described.

14. In a gas-engine, an igniting-valve, 54 or 55, having a recess, 52 or 53, and a port, 30 or 31, through which the charge in the cylinder is fired, of an annular burner, 50 or 51, located in said recess and surrounding said port, whereby the flame of said burner entirely surrounds the jet of the explosive mixture which issues through said port when the same is brought into communication with the interior of the cylinder, substantially as described.

15. In a gas-engine, the combination, with a port, 28 or 29, communicating with the interior of the power-cylinder, of an igniting-valve, 54 or 55, having a port, 30 or 31, communicating directly with the flame of an igniting-burner, and arranged to be brought into communication with said port 28 or 29 to fire the charge, said ports being made of different form, so as to prevent a too rapid opening of communication between the two, substantially as described.

16. In a gas-engine, the combination, with a port, 28 or 29, communicating with the interior of the power-cylinder, of an igniting-valve, 54 or 55, having a port, 30 or 31, communicating with the flame of an igniting-burner, and arranged to be brought into communication with said port 28 or 29, to fire the charge, one of said ports being of polygonal and the other of rhomboidal form, substantially as described.

17. In a gas-engine, the induction-valve 121, provided with oil-chambers at its opposite ends, said chambers having ports 2, through which the oil is supplied to the bearings of the valve, substantially as described.

18. In a gas-engine, the induction-valve 121, provided with oil-chambers at its opposite ends, and having the openings 75 1 and valve-rod 74, by which the oil is supplied from one chamber to the other, substantially as described.

19. In a gas-engine, an oil-cup, 76 or 77, the stem of which is provided with a check-valve, 80, and communicates with a passage through which the explosive mixture passes in entering the power-cylinder, substantially as described.

20. In a gas-engine, the combination, with the power-cylinder having its exhaust-opening at or near the middle of its length, of a power-piston provided with an annular air-chamber which is brought into communication with the exhaust-opening as the piston reciprocates, substantially as described.

In testimony whereof I have hereunto set my hand in the presence of two subscribing witnesses.

PETER MURRAY, JR.

Witnesses:
T. H. PALMER,
J. A. HOVEY.